(12) United States Patent
Barkai et al.

(10) Patent No.: US 8,844,019 B2
(45) Date of Patent: Sep. 23, 2014

(54) PENALTY BOX FOR MITIGATION OF DENIAL-OF-SERVICE ATTACKS

(71) Applicant: Check Point Software Technologies Ltd., Tel Aviv (IL)

(72) Inventors: Ofer Barkai, Givatayim (IL); Dorit Dor, Hod Hasharon (IL); Tamir Zegman, Tel Aviv (IL)

(73) Assignee: Check Point Software Technologies Ltd., Tel Aviv (IL)

(*) Notice: Subject to any disclaimer, the term of this patent is extended or adjusted under 35 U.S.C. 154(b) by 154 days.

(21) Appl. No.: 13/682,754

(22) Filed: Nov. 21, 2012

(65) Prior Publication Data
US 2014/0143850 A1 May 22, 2014

(51) Int. Cl.
*H04L 29/06* (2006.01)
(52) U.S. Cl.
CPC ........ *H04L 63/0281* (2013.01); *H04L 63/1458* (2013.01); *H04L 63/0227* (2013.01)
USPC ............................................. 726/12; 726/22
(58) Field of Classification Search
CPC . H04L 29/06; H04L 63/1458; H04L 63/0227; H04L 63/0281
USPC ......................................... 726/12, 11, 22, 23
See application file for complete search history.

(56) References Cited

U.S. PATENT DOCUMENTS

| | | | |
|---|---|---|---|
| 2003/0236995 A1* | 12/2003 | Fretwell, Jr. | 713/200 |
| 2005/0091513 A1* | 4/2005 | Mitomo et al. | 713/188 |
| 2007/0061874 A1* | 3/2007 | Coppola et al. | 726/10 |
| 2007/0121596 A1* | 5/2007 | Kurapati et al. | 370/356 |
| 2009/0254970 A1* | 10/2009 | Agarwal et al. | 726/1 |
| 2011/0314143 A1* | 12/2011 | Vogel et al. | 709/224 |
| 2013/0227683 A1* | 8/2013 | Bettini et al. | 726/22 |
| 2013/0254343 A1* | 9/2013 | Stevens et al. | 709/219 |

OTHER PUBLICATIONS

Almerhag et al., "Network Security for QoS Routing Metrics", May 11-13, 2010, International Conference on Computer and Communication Engineering (ICCCE 2010), pp. 1-6.*

* cited by examiner

*Primary Examiner* — Matthew Smithers
(74) *Attorney, Agent, or Firm* — Mark M. Friedman

(57) ABSTRACT

A security gateway of a computer network receives incoming packets at one or more network interfaces. One or more security functions are applied to the packets. Reports of security function violations are recorded. The reports include the source addresses of the packets, the times that the packets were received, and descriptions of the violations. The descriptions include weights, and if the sum of the weights, for packets of a common source address that are received within a first time interval, exceeds a threshold, subsequent packets from that source address are dropped. Alternatively, in a "monitor only" mode, the common source address is logged but packets are not dropped. Optionally, encrypted packets and/or packets received at some network interfaces but not at other network interfaces are not dropped.

15 Claims, 2 Drawing Sheets

PENALTY BOX FOR MITIGATION OF DENIAL-OF-SERVICE ATTACKS

FIELD AND BACKGROUND OF THE INVENTION

The present invention relates to network computing and, more particularly, to a method of mitigating Denial-of-Service and Distributed-Denial-of-Service attacks.

In network computing a Denial-of-Service attack is an attack whose purpose is to disrupt normal service of a computer system or network. In many cases such attacks are carried out by overwhelming the computer system or network with a large number of packets, connections or requests. In some cases these attacks are distributed and carried out from multiple sources. In such a case these attacks are called Distributed-Denial-of-Service attacks.

For these attacks to be successful it suffices to overload just one of the network components leading to the server whose service is to be disrupted. Such a component could be a router, a switch, a load balancer or a security gateway.

In a typical network environment, servers are placed behind security gateways that perform one or more of several security functions including:
   Firewall
   Virtual Private Networking
   Intrusion Prevention
   Application Control In many cases, some or all of the packets belonging to Denial-of-Service and Distributed-Denial-of-Service attacks are blocked by these security gateways due to the fact that the attacks violate one or more aspect of the gateways' security policies. These violations could include the packet matching a firewall drop rule, the use of an unauthorized application or an attempt to exploit a server's vulnerability.

Even if all of the packets, connections or requests that violate the security policies are blocked by a security gateway, the resources needed in order to process the packets, connections or requests on the security gateway could be high—thus impacting the ability of the system to provide normal service.

In addition, some of the traffic generated by the sources of the attacks might be allowed under the current security policies and be forwarded onward to the servers. This traffic could then overload the network or servers and disrupt normal service.

It would be highly advantageous to have a method of mitigating Denial-of-Service and Distributed-Denial-of-Service attacks that is more parsimonious with security gateway resources than known methods.

SUMMARY OF THE INVENTION

According to the present invention there is provided a computer network security method including the steps of: at a security gateway, of a computer network, that receives incoming packets at a network interface of the security gateway, for at least a portion of the incoming packets: (a) applying at least one security function to each incoming packet of the at least portion; (b) if the each incoming packet violates one of the at least one security function, logging a report, of the each incoming packet, that includes a record of a source address of the each incoming packet, a time of receipt of the each incoming packet, and a description of the violation of the one security function; (c) assigning a weight to the report; and (d) if a sum of the weights, for the incoming packets that share a common source address and that are received within a first predetermined time interval, exceeds a predetermined threshold: dropping at least a portion of subsequently received packets that have the common source address.

According to the present invention there is provided a security gateway including: (a) a network interface; (b) a non-volatile memory wherein is stored computer code for: (i) applying at least one security function to each of at least a portion of incoming packets that are received at the network interface, (ii) if the each incoming packet violates one of the at least one security function: logging a report, of the each incoming packet, that includes a record of a source address of the each incoming packet, a time of receipt of the each incoming packet, and a description of the violation of the one security function, (iii) assigning a weight to the report, and (iv) if a sum of the weights, for the incoming packets that share a common source address and that are received within a first predetermined time interval, exceeds a predetermined threshold: dropping at least a portion of subsequently received packets that have the common source address; and (c) a processor for executing the computer code.

According to the present invention there is provided a non-transient computer-readable storage medium having computer-readable code embodied on the computer-readable storage medium, the computer-readable code for enforcing security at a security gateway, of a computer network, that receives incoming packets at a network interface of the security gateway, the computer-readable code including program code for, fir at least a portion of the incoming packets: (a) applying at least one security function to each incoming packet of the at least portion; and (b) if the each incoming packet violates one of the at least one security function, logging a report, of the each incoming packet, that includes a record of a source address of the each incoming packet, a time of receipt of the each incoming packet, and a description of the violation of the one security function; (c) assigning a weight to the report; and (d) if a sum of the weights, for the incoming packets that share a common source address and that are received within a first predetermined time interval, exceeds a predetermined threshold: dropping at least a portion of subsequently received packets that have the common source address.

According to the present invention there is provided a computer network security method including the steps of: at a security gateway, of a computer network, that receives incoming packets at a network interface of the security gateway, for at least a portion of the incoming packets: (a) applying at least one security function to each incoming packet of the at least portion; (b) if the each incoming packet violates one of the at least one security function, logging a report, of the each incoming packet, that includes a record of a source address of the each incoming packet, a time of receipt of the each incoming packet, and a description of the violation of the one security function; (c) assigning a weight to the report; and (d) if a sum of the weights, for the incoming packets that share a common source address and that are received within a first predetermined time interval, exceeds a predetermined threshold: logging the common source address.

According to the present invention there is provided a security gateway including: (a) a network interface; (b) a non-volatile memory wherein is stored computer code for: (i) applying at least one security function to each of at least a portion of incoming packets that are received at the network interface, (ii) if the each incoming packet violates one of the at least one security function: logging a report, of the each incoming packet, that includes a record of a source address of the each incoming packet, a time of receipt of the each incoming packet, and a description of the violation of the one security function, (iii) assigning a weight to the report, and (iv) if a sum of the weights, for the incoming packets that share a common source address and that are received within a first predetermined time interval, exceeds a predetermined threshold: logging the common source address; and (c) a processor for executing the computer code.

According to the present invention there is provided a non-transient computer-readable storage medium having computer-readable code embodied on the computer-readable storage medium, the computer-readable code for enforcing security at a security gateway, of a computer network, that receives incoming packets at a network interface of the security gateway, the computer-readable code including program code for, fir at least a portion of the incoming packets: (a) applying at least one security function to each incoming packet of the at least portion; and (b) if the each incoming packet violates one of the at least one security function, logging a report, of the each incoming packet, that includes a record of a source address of the each incoming packet, a time of receipt of the each incoming packet, and a description of the violation of the one security function; (c) assigning a weight to the report; and (d) if a sum of the weights, for the incoming packets that share a common source address and that are received within a first predetermined time interval, exceeds a predetermined threshold: logging the common source address.

In a first basic computer network security method of the present invention, for a security gateway that receives incoming packets at a network interface, for at least a portion of the incoming packets, one or more security functions are applied to each incoming packet and, for each incoming packet that violates (one or more of) the security function(s), a report of the violation is logged. "Logging" a report means recording, usually in a memory of the security gateway, a report that includes at least the source address of the packet, the time at which the packet arrived and (a) description(s) of the violation(s) that caused the report to be logged. Each report is assigned a weight, and if the sum of the weights, for incoming packets that share a common source address and that are received within a first predetermined time interval, exceeds a predetermined threshold, at least a portion of subsequently received packets that also have that common source address are dropped. The exemplary mechanism described below for dropping those packets uses a "penalty box" table to record the source addresses of incoming packets that are to be dropped. Optionally, encrypted packets are not dropped despite having that common source address. Optionally, if the security gateway receives incoming packets at more than one network interface, incoming packets that are received at some of the network interfaces are not dropped despite having that common source address.

Preferably, the common source address is logged. In the exemplary mechanism described below, the common source address is logged when it is added to the penalty box table.

Preferably, the subsequently received packets that are dropped are dropped only during a second predetermined time interval, after which, in the exemplary mechanism described below, the common source address is deleted from the penalty box table. Most preferably, the common source address is logged at the end of the second predetermined time interval. In the exemplary mechanism described below, the common source address is logged when it is deleted from the penalty box table.

Preferably, the weight that is assigned to the report of an encrypted packet is lower than the weight that is assigned to an unencrypted packet. In some embodiments, encrypted packets are assigned zero weight and so are ignored.

Preferably, the security gateway receives incoming packets at a plurality of network interfaces. Each incoming packet's report includes a record of the network interface at which the incoming packet was received, and the weights that are assigned to incoming packets received at some network interfaces are lower than the weights that are assigned to incoming packets received at other network interfaces. In some embodiments, the incoming packets at some network interfaces are assigned zero weight, and those packets are ignored.

Optionally, a white list is provided, such that the portion of the incoming packets for which, reports are logged excludes incoming packets whose respective source addresses are in the white list.

Exemplary security functions include a firewall, virtual private networking, intrusion prevention and application control.

A second basic computer network security method of the present invention is similar to the first basic method but operates in a "monitor only" mode: the common source address is logged but packets received subsequently from that source address are not dropped.

The scope of the present invention also includes security gateways that implement the methodology of the present invention and non-transient computer-readable storage media that bear computer-readable code for implementing the methodology of the present invention.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of computer network security according to the present invention may be better understood with reference to the drawings and the accompanying description.

In order to mitigate Denial-of-Service attacks and Distributed-Denial-of-Service attacks, the present invention provides a penalty box mechanism. The penalty box mechanism of the present invention is used by various components of the security gateway to report client addresses that violate the part of the security policy that these components enforce. Thus, a firewall component could report to the penalty box mechanism that a certain client IP address has violated the firewall component's rule base policy by sending a packet that was dropped by the firewall component; or an Intrusion Prevention System component could report that a certain client IP address has tried to exploit server vulnerability.

Figure 1:
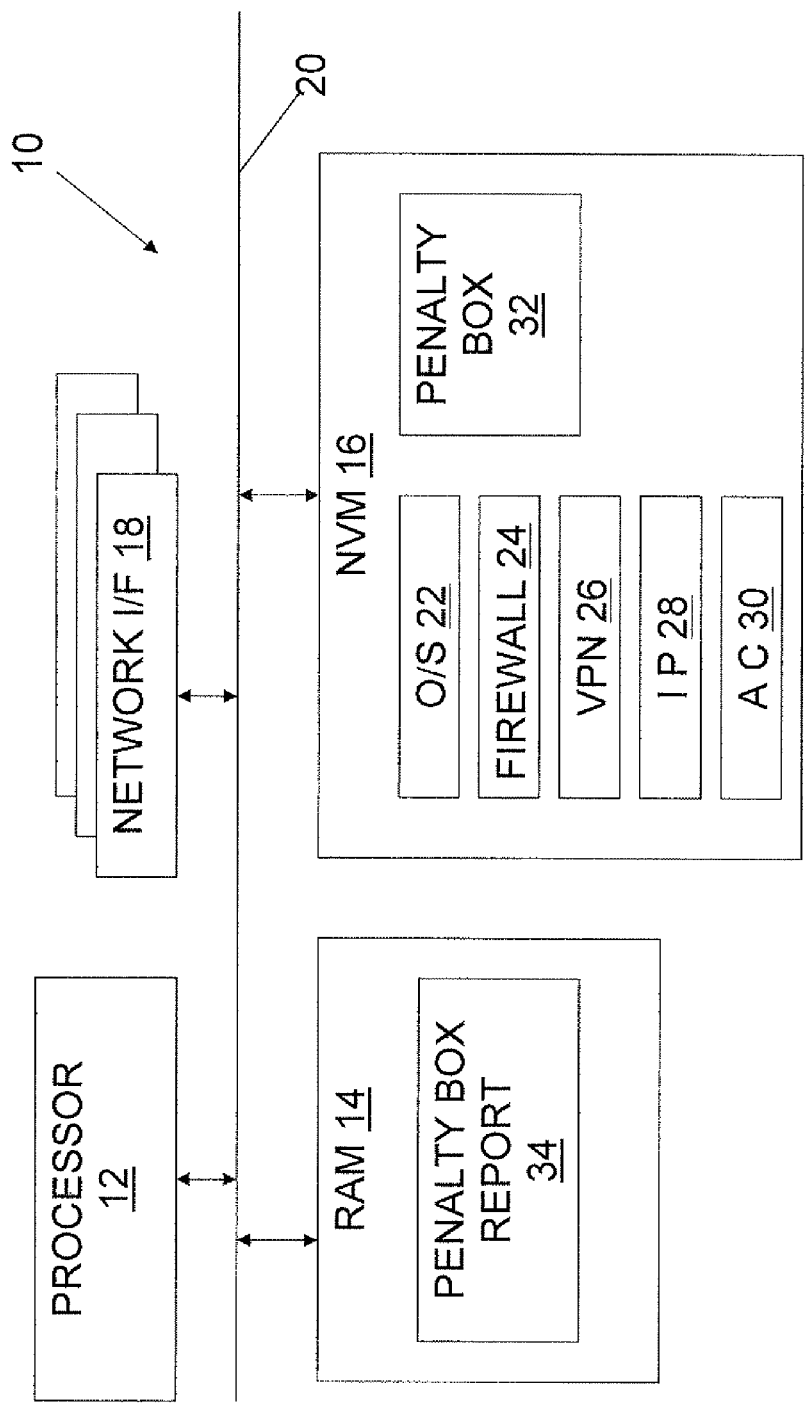
FIG. 1 is a high-level partial schematic block diagram of an exemplary security gateway of the present invention.

Referring now to the drawings, FIG. 1 is a high-level partial schematic block diagram of an exemplary security gateway 10 of the present invention. Security gateway 10 includes a processor 12, a random access memory (RAM) 14, a non-volatile memory (NVM) 16 such as a hard disk or a flash disk, and several network interfaces 18, all communicating with each other via a common bus 20.

In NVM 16 are stored executable code for implementing the following functionality: an operating system (O/S) 22, a firewall 24, VPN 26, intrusion prevention 28, application control 30 and a penalty box mechanism 32 of the present invention. When security gateway 10 is turned on, a boot mechanism (not shown) loads the code of O/S 22 into RAM 14. Processor 12 executes the code of O/S 22 in RAM 14 for the overall control of security gateway 10. In particular, processor 12 executes the code of O/S 22 to load the codes of security functionalities 24, 26, 28 and 30 and of penalty box mechanism 32 into RAM 14 and then executes those codes 24, 26, 28, 30 and 32 in RAM 14. One part 34 of RAM 14 is reserved for use as a penalty box table.

NVM 16 is an example of a non-transient computer-readable storage medium on which is embodied computer-readable code for implementing the present invention. Other such non-transient computer-readable storage media include optical disks such as compact disks and DVDs.

Security gateway 10 receives packets at network interfaces 18 from respective networks. Each of security functionalities 24, 26, 28 and 30 is configured to test each incoming packet for violation of a respective rule of that functionality. For each packet that violates a rule of a security functionality 24, 26, 28 or 30, that security functionality logs the violation as a report in RAM 14 and notifies the penalty box mechanism 32 that the violation has been logged. The report includes at least the source IP address of the offending packet, a timestamp that indicates the time at which the offending packet was received, and a description of the nature of the violation. The minimal description of the violation is simply a statement of which security functionality 24, 26, 28 or 30 reports the violation. Optionally, in a security gateway 10 that has more than one network interface 18, the report also includes an identifier of the network interface 18 at which the offending packet was received. Optionally, the report includes an indication of whether the offending packet is encrypted.

Having been notified that a violation has been logged, penalty box mechanism 32 reads the report in RAM 14. In the simplest configuration of penalty box mechanism 32, penalty box mechanism just counts the number of offending packets that are received from each source IP address. If the number of offending packets received from a particular source IP address within a first configurable predetermined time interval exceeds a configurable predetermined threshold, penalty box mechanism 32 automatically drops all subsequent packets from that source IP address for the duration of a second configurable predetermined time interval. In support of this functionality, penalty box mechanism 32 records the source IP address to be blocked and an expiration time of the blocking in penalty box table 34. For every packet that is received at network interface(s) 18, penalty box mechanism 32 checks the source IP address of the packet against the source IP addresses recorded in penalty box table 34 and drops the packet if the source IP address of the packet matches one of the source IP addresses that are recorded in penalty box table 34. Penalty box mechanism 32 also periodically reviews penalty box table 34 and deletes from penalty box table 34 source IP addresses whose expiration times have passed. Optionally, the fact that a source IP address has been deleted from penalty box table 34 is logged, along with a timestamp.

In an enhanced embodiment of security gateway 10, each report from a security functionality 24, 26, 28 or 30 includes a weight assigned to the nature of the reported security violation. Penalty box mechanism 32 adds up the weights associated with each offending source IP address. When the cumulative weight of a source IP address exceeds a configurable predetermined threshold, penalty box mechanism 32 decides that that source IP address needs to be blocked and records that source IP address, along with an expiration time of the blocking, in penalty box table 34. A "leaky bucket" mechanism is used to periodically decrease the cumulative weights of the source IP addresses in order to require that the cumulative weight of a source IP address must be increasing at a sufficiently high rate per unit time in order to warrant the blocking of packets from that source IP address. The basic embodiment, in which penalty box mechanism 32 responds to the receipt of too many offending packets from a particular source IP address within a configurable time interval, is a special case of this enhanced embodiment in which all the weights are equal.

Figure 2:
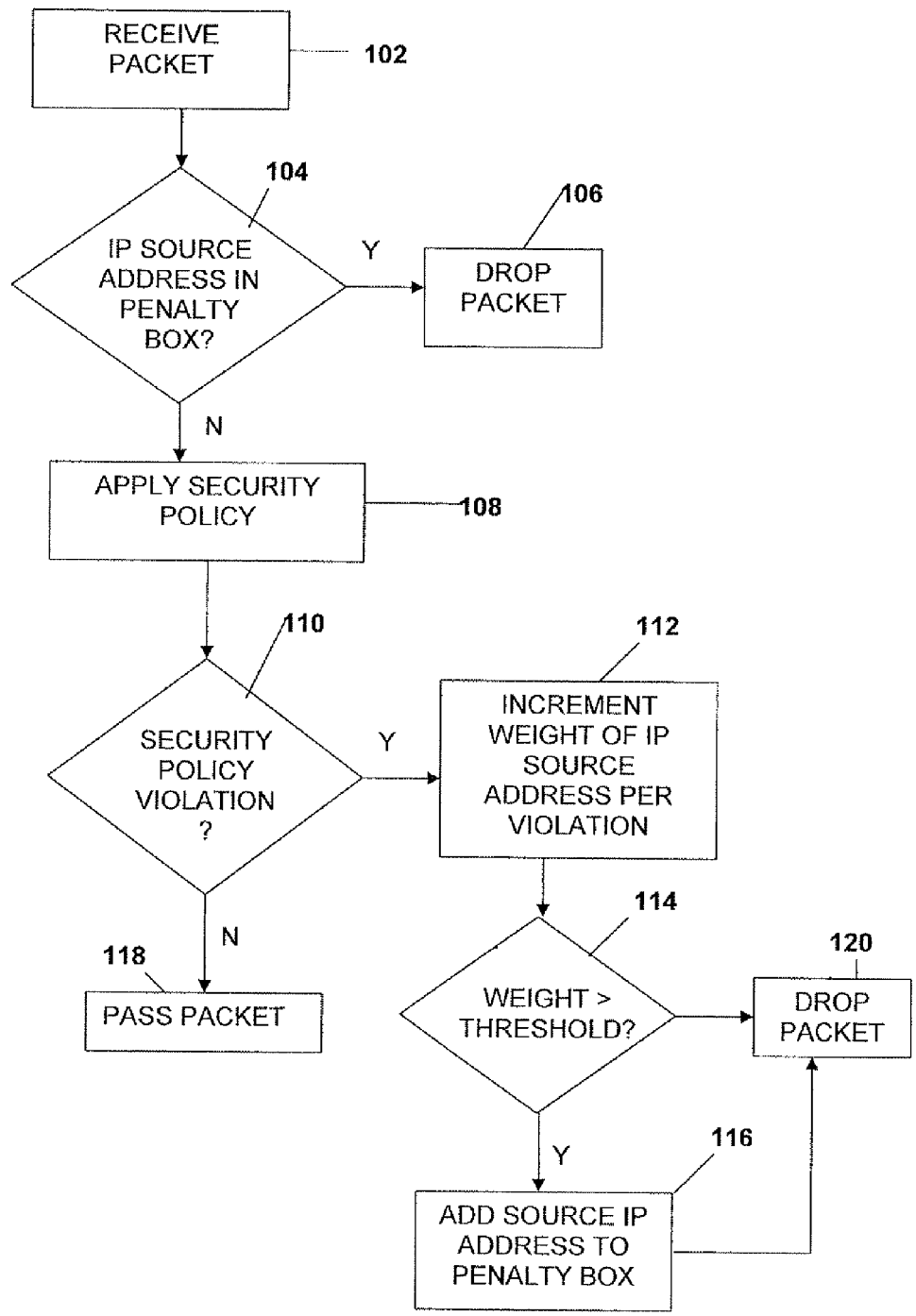
FIG. 2 is a flow chart of packet blocking according to one embodiment of the present invention.

FIG. 2 is a flow chart of packet blocking in this enhanced embodiment of security gateway 10. In block 102, a packet is received from a network. In block 104, penalty box mechanism 32 compares the source IP address of the packet to the list of source IP addresses in penalty box table 34. If the packet's source IP address appears in penalty box table 34, the packet is dropped (block 106). If the packet's source IP address does not appear in penalty box table 34, the packet is passed to security functionalities 24, 26, 28 and 30 for evaluation (block 108). If no security violation is found, the packet is forwarded towards its destination (block 118). A security functionality 24, 26, 28 and 30 that identifies a security violation (block 110) logs the violation as a report in RAM 14 and notifies the penalty box mechanism 32 that the violation has been logged. The report includes a description, of the nature of the violation, that includes at least a respective weight. In block 112, penalty box mechanism 32 adds the reported weight to the cumulative weight of the source IP address in question. In block 114, penalty box mechanism 32 compares the cumulative weight of the source IP address in question to a threshold. If the cumulative weight of the source IP address in question exceeds the threshold, then in block 116 penalty box mechanism 32 adds the source IP address in question to penalty box table 34. Whether or not the cumulative weight of the source IP address in question exceeds the threshold, the offending packet is dropped in block 120.

Other configuration options for penalty box mechanism 32 include ignoring reports of encrypted packets, ignoring packets whose source IP addresses appear in a "white list" of source IP addresses, and (in an embodiment of security gateway 10 with more than one network interface 18) ignoring reports of packets received from certain network interfaces 18.

Optionally, security gateway 10 is configured to be operable in a "monitor only" mode in which logs are kept of when source IP addresses are added to penalty box table 34 and removed from penalty box table 34, but the source IP addresses of incoming packets are not compared to the list of source IP addresses in penalty box table 34.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A computer network security method comprising the steps of: at a security gateway, of a computer network, that receives incoming packets at a network interface of said security gateway, for at least a portion of said incoming packets:

(a) applying at least one security function to each said incoming packet of said at least portion;

(b) if said each incoming packet violates one of said at least one security function, logging a report, of said each incoming packet, that includes a record of a source address of said each incoming packet, a time of receipt of said each incoming packet, and a description of said violation of said one security function;

(c) assigning a weight to said report; and (d) if a sum of said weights, for said incoming packets that share a common said source address and that are received within a first predetermined time interval, exceeds a predetermined threshold: dropping at least a portion of subsequently received packets that have said common source address.

2. The method of claim 1, wherein said at least portion of said subsequently received packets excludes said subsequently received packets that are encrypted.

3. The method of claim 1, wherein said security gateway receives said incoming packets at a plurality of said network interfaces, and wherein said at least portion of said subsequently received packets excludes said subsequently received packets that are received at one of said network interfaces.

4. The method of claim 1, further comprising the step of:
(e) logging said common source address.

5. The method of claim 1, wherein said at least portion of said subsequently received packets are dropped only during a second predetermined time interval.

6. The method of claim 5, further comprising the step of:
(e) at an end of said predetermined time interval, logging said common source address.

7. The method of claim 1, wherein said weight, that is assigned to said report, is lower for an encrypted said incoming packet than for an unencrypted said incoming packet.

8. The method of claim 1, wherein said security gateway receives said incoming packets at a plurality of said network interfaces, wherein said report of said each incoming packet also includes a record of said network interface at which said each incoming packet was received, and wherein said weight, that is assigned to said report, is lower for a first said network interface that for a second said network interface.

9. The method of claim 1, further comprising the step of:
(c) providing a white list of at least one source address, such that said at least portion of said incoming packets excludes said incoming packets whose respective source addresses are in said white list.

10. The method of claim 1, wherein said at least one security function is selected from the group consisting of a firewall, virtual private networking, intrusion prevention and application control.

11. A security gateway comprising:
(a) a network interface;
(b) a non-volatile memory wherein is stored computer code for:
  (i) applying at least one security function to each of at least a portion of incoming packets that are received at said network interface,
  (ii) if said each incoming packet violates one of said at least one security function: logging a report, of said each incoming packet, that includes a record of a source address of said each incoming packet, a time of receipt of said each incoming packet, and a description of said violation of said one security function,
  (iii) assigning a weight to said report, and
  (iv) if a sum of said weights, for said incoming packets that share a common said source address and that are received within a first predetermined time interval, exceeds a predetermined threshold: dropping at least a portion of subsequently received packets that have said common source address; and
(c) a processor for executing said computer code.

12. A non-transient computer-readable storage medium having computer-readable code embodied on the computer-readable storage medium, the computer-readable code for enforcing security at a security gateway, of a computer network, that receives incoming packets at a network interface of the security gateway, the computer-readable code comprising program code for, for at least a portion of said incoming packets: (a) applying at least one security function to each said incoming packet of said at least portion; (b) if said each incoming packet violates one of said at least one security function, logging a report, of said each incoming packet, that includes a record of a source address of said each incoming packet, a time of receipt of said each incoming packet, and a description of said violation of said one security function; (c) assigning a weight to said report; and (d) if a sum of said weights, for said incoming packets that share a common said source address and that are received within a first predetermined time interval, exceeds a predetermined threshold: dropping at least a portion of subsequently received packets that have said common source address.

13. A computer network security method comprising the steps of: at a security gateway, of a computer network, that receives incoming packets at a network interface of said security gateway, for at least a portion of said incoming packets:
(a) applying at least one security function to each said incoming packet of said at least portion; and
(b) if said each incoming packet violates one of said at least one security function, logging a report, of said each incoming packet, that includes a record of a source address of said each incoming packet, a time of receipt of said each incoming packet, and a description of said violation of said one security function;
(c) assigning a weight to said report; and
(d) if a sum of said weights, for said incoming packets that share a common said source address and that are logged within a first predetermined time interval, exceeds a predetermined threshold: logging said common source address.

14. A security gateway comprising:
(a) a network interface;
(b) a non-volatile memory wherein is stored computer code for:
  (i) applying at least one security function to each of at least a portion of incoming packets that are received at said network interface,
  (ii) if said each incoming packet violates one of said at least one security function: logging a report, of said each incoming packet, that includes a record of a source address of said each incoming packet, a time of receipt of said each incoming packet, and a description of said violation of said one security function,
  (iii) assigning a weight to said report, and
  (iv) if a sum of said weights, for said incoming packets that share a common said source address and that are received within a first predetermined time interval, exceeds a predetermined threshold: logging said common source address; and
(c) a processor for executing said computer code.

15. A non-transient computer-readable storage medium having computer-readable code embodied on the computer-readable storage medium, the computer-readable code for enforcing security at a security gateway, of a computer network, that receives incoming packets at a network interface of the security gateway, the computer-readable code comprising program code for, for at least a portion of said incoming packets: (a) applying at least one security function to each said incoming packet of said at least portion; (b) if said each incoming packet violates one of said at least one security function, logging a report, of said each incoming packet, that includes a record of a source address of said each incoming packet, a time of receipt of said each incoming packet, and a description of said violation of said one security function; (c) assigning a weight to said report; and (d) if a sum of said weights, for said incoming packets that share a common said source address and that are received within a first predetermined time interval, exceeds a predetermined threshold: logging said common source address.

* * * * *